US009615565B2

(12) United States Patent
Singleterry

(10) Patent No.: US 9,615,565 B2
(45) Date of Patent: Apr. 11, 2017

(54) DEVICE, METHOD AND SYSTEM FOR KILLING AND DISPOSING OF PARASITES

(71) Applicant: Patricia L. Singleterry, Naples, FL (US)

(72) Inventor: Patricia L. Singleterry, Naples, FL (US)

( * ) Notice: Subject to any disclaimer, the term of this patent is extended or adjusted under 35 U.S.C. 154(b) by 717 days.

(21) Appl. No.: 14/025,665

(22) Filed: Sep. 12, 2013

(65) Prior Publication Data

US 2015/0068106 A1 Mar. 12, 2015

(51) Int. Cl.
*A01M 1/20* (2006.01)

(52) U.S. Cl.
CPC ........................ *A01M 1/20* (2013.01)

(58) Field of Classification Search
CPC .... A01M 1/20; A01M 1/2005; A01M 1/2011; A01M 1/2016; A01K 13/00; A01K 13/001; A01K 13/003; G01F 11/286; G01F 11/288; B67D 7/163; B67D 7/167
See application file for complete search history.

(56) References Cited

U.S. PATENT DOCUMENTS

| | | | | |
|---|---|---|---|---|
| 2,069,048 | A | * | 1/1937 | Rehberger ............. A45D 27/16 220/212 |
| 2,183,662 | A | | 12/1939 | Warr et al. |
| 2,593,591 | A | * | 4/1952 | Menkin ............... B05B 11/3001 222/205 |
| 2,774,517 | A | * | 12/1956 | Teegardin ............ A47K 5/1205 222/205 |
| 3,263,871 | A | * | 8/1966 | Thompson .......... B05B 11/0072 222/205 |
| 4,660,746 | A | * | 4/1987 | Wright ................. G01F 11/286 141/380 |
| 4,748,767 | A | | 6/1988 | Sandels |
| 5,685,261 | A | | 11/1997 | Krietzman |
| 6,808,717 | B1 | | 10/2004 | Bale |
| 6,920,716 | B2 | | 7/2005 | Kollars, Jr. et al. |

(Continued)

OTHER PUBLICATIONS

Flea and Tick: FAQs About Ticks, http://www.1800petmeds.com/education/faq-ticks-on-dogs-cats-7.htm, dated Dec. 4, 2012, accessed Jun. 3, 2016.*

(Continued)

*Primary Examiner* — Kathleen Alker
(74) *Attorney, Agent, or Firm* — Livingston Loeffler, P.A.; Edward M. Livingston, Esq.; Bryan L. Loeffler, Esq.

(57) ABSTRACT

A device, method and system for killing and disposing of parasites, such as ticks and fleas, wherein a dispenser (1) having a bowl-shaped reservoir (5) located on a dispensing cap (4) is filled with an alcohol based solution (3) that is stored in a bottle (2) and pumped through a supply tube (6) into the bowl-shaped reservoir. Parasites may be placed into the bowl-shaped reservoir and alcohol based solution to kill the parasites. The used alcohol based solution and bowl-shaped reservoir may then be cleaned and dispenser may be stored until needed again. The dispenser may be stored near an entry way through which the animal commonly enters a home after being outside so that the animal may be checked for parasites immediately upon entry into the home. The device, method and system may also be used by groomers, veterinarians and kennels when checking an animal for parasites.

5 Claims, 1 Drawing Sheet

(56) References Cited

U.S. PATENT DOCUMENTS 7,604,814 B2 10/2009 Schaffner et al.
2010/0205767 A1 8/2010 Lewis

OTHER PUBLICATIONS

Getting a Tick Off of Your Dog, http://www.humanesociety.org/animals/dogs/tips/getting_ticks_off_dog.html, dated Dec. 5, 2010, accessed Jun. 3, 2016.*
www.purespadirect.com Printout Nov. 20, 2012.
www.burmax.com Printout Nov. 20, 2012.

* cited by examiner

DEVICE, METHOD AND SYSTEM FOR KILLING AND DISPOSING OF PARASITES

FIELD OF THE INVENTION

This invention relates to the removal and disposal of parasites from animals, and more particularly, a device method and system for quickly and sanitarily killing and disposing of parasites, such as ticks and fleas, from an animal.

BACKGROUND OF THE INVENTION

If a dog or other animal spends time outside in areas where ticks and fleas are likely to reside, then there is a high probability that the dog will attract and pick up these parasites. Those parasites may then latch into the dog or be carried into the dog owner's home where they may be passed to other animals or humans.

Even the best repellents may not prevent these parasites from latching onto a dog, especially in the case of ticks. It can only take a few hours for an attached tick to transmit an infection to its host. Transmission of disease from a tick to a host can occur after the tick regurgitates germs from its gut into the bite site. Thus, it is important to check dogs and other animals on a regular basis for ticks and to dispose of the ticks as quickly as possible. However, parasites such as ticks and fleas are difficult to kill. Ticks and fleas can withstand a great deal of pressure, so crushing them between your fingers is often unsuccessful. Grinding them between two fingernails works sometimes, but is also very difficult and unsanitary.

A conventional method for killing ticks and fleas is to submerge the ticks and fleas into an alcohol based solution that has been poured into a bowl. However, this can be cumbersome, especially if an individual finds a tick or flea and a bowl of alcohol is not already set up. In this case the individual needs to find a bowl and alcohol based solution and then pour the solution into the bowl while holding a live tick or flea in between his or her fingers so it will not escape. To prevent such parasites from being carried into a home it is important to check dogs and other animals on a regular basis and preferably prior to or immediately after the dog is allowed back into the home. This means that an alcohol based solution has to be ready in case any parasites are found.

Therefore, a need exists for a device, method and system for killing and disposing of parasites that is quick, easy and sanitary and for a device that is readily within reach and use of the individual checking for parasites.

The relevant prior art includes the following references:

| Pat. No. | Inventor | Issue/Publication Date |
|---|---|---|
| (U.S. Patent References) | | |
| 2,183,662 | Warr et al. | Dec. 19, 1939 |
| 4,784,767 | Sandels | Jun. 7, 1988 |
| 5,685,261 | Krietzman | Nov. 11, 1997 |
| 6,808,717 | Bale | Oct. 26, 2004 |
| 6,920,716 | Kollars, Jr. et al. | Jul. 26, 2005 |
| 7,604,814 | Schaffner et al. | Oct. 20, 2009 |
| 2010/0205767 | Lewis | Aug. 19, 2010 |

NON-PATENT LITERATURE www.purespadirect.com Nov. 20, 2012
www.burmax.com Nov. 20, 2012

SUMMARY OF THE INVENTION

The primary object of the present invention is to provide a device, method and system for killing and disposing of parasites that is quick, easy and sanitary and a device that is readily within reach and use of an individual checking for parasites.

The present invention fulfills the above and other objects by providing a dispenser having a bottle filled with an alcohol based solution. A dispensing cap located on the bottle has a bowl-shaped reservoir that is filled by pushing downward on the dispensing cap thereby forcing the alcohol based solution through a supply tube upward through an aperture in the bowl-shaped reservoir, thereby filling the bowl-shaped reservoir with a predetermined amount of the alcohol based solution. A lid, which may be hingedly attached to the dispensing cap, is used to cover the bowl-shaped reservoir when the dispenser is not in use.

To use the dispenser an individual pushes downward on the dispensing cap to fill the bowl-shaped reservoir with a predetermined amount of alcohol based solution from the bottle. Then, the individual examines an animal for parasites, such as ticks and fleas, that are located on the skin and/or in the fur of the animal. If a parasite is found, the individual places the parasite into the alcohol based solution located in the bowl-shaped reservoir. When the individual is finished removing parasites from the animal, the individual cleans the dispensing cap by rinsing the bowl-shaped reservoir out in a sink or by wiping the alcohol based solution and any dead parasites out of the bowl-shaped reservoir. The dispenser may then be used again or stored by closing a lid over the bowl-shaped reservoir to prevent the alcohol based solution within the bottle from evaporating.

The present invention may be stored near an entry way through which the animal commonly enters a home after being outside so that the animal may be checked for parasites immediately upon entry into the home. The present invention may also be used by groomers, kennels and/or veterinarians while checking an animal for parasites.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
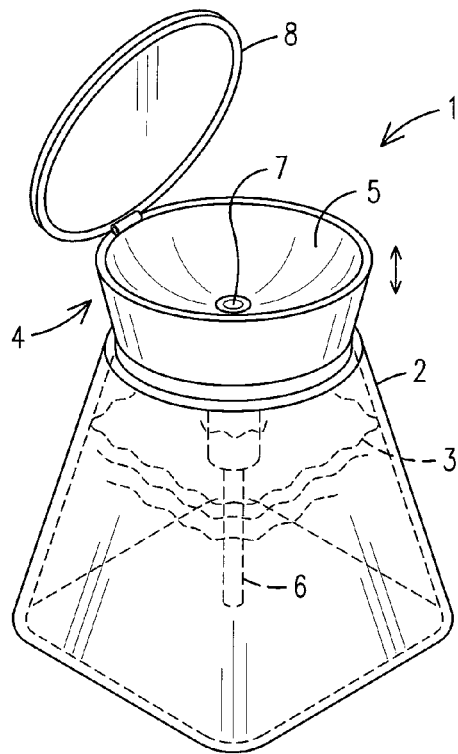
FIG. 1 is a perspective top view of a dispenser of the present invention used for killing and disposing of parasites.

For purposes of describing the preferred embodiment, the terminology used in reference to the numbered components in the drawings is as follows:

1. dispenser, generally
2. bottle
3. alcohol based solution
4. dispensing cap
5. bowl-shaped reservoir
6. supply tube
7. aperture
8. lid With reference to FIG. 1, a perspective top view of a dispenser 1 of the present invention used for killing and disposing of parasites is illustrated. The dispenser comprises a bottle 2 filled with an alcohol based solution 3. A dispensing cap 4 located on the bottle 2 has a bowl-shaped reservoir 5 that is filled by pushing downward on the dispensing cap 4 thereby forcing the alcohol based solution 3 through a supply tube 6 upward through an aperture 7 in the dispensing cap 4, thereby filling the bowl-shaped reservoir 5 with a predetermined amount of the alcohol based solution 3. A lid 8, which may be hingedly attached to the dispensing cap 4, is used to cover the dispensing cap 4 when the dispenser 1 is not in use.

Figure 2:
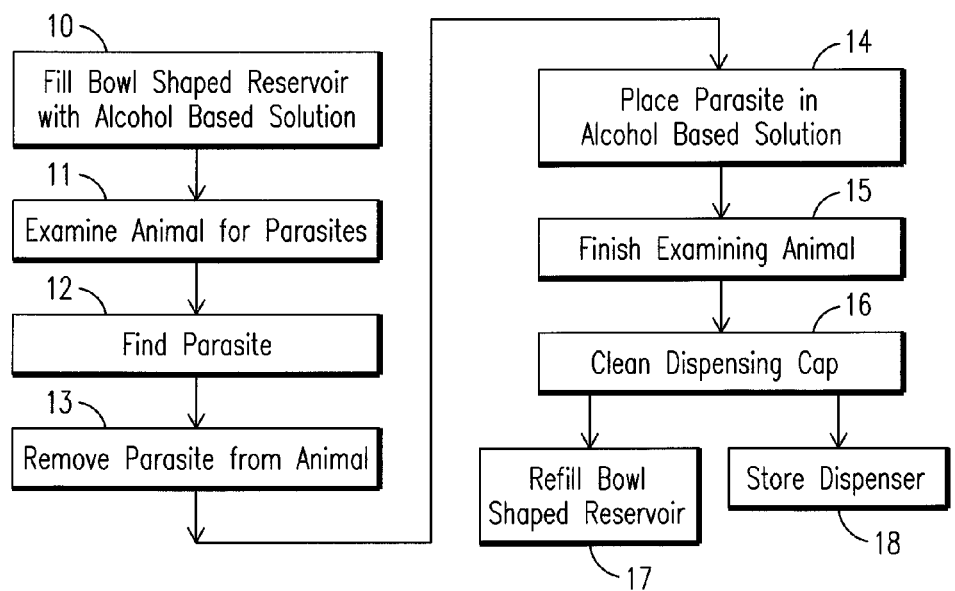
FIG. 2 is a flowchart showing the method and system of the present invention.

With reference to FIG. 2, a flowchart showing the method and system of the present invention is illustrated. To use dispenser of the present invention to kill and dispose of parasites, an individual first pushes downward on the dispensing cap to fill the bowl-shaped reservoir with a predetermined amount of alcohol based solution from the bottle 10. Then, the individual examines an animal for parasites, such as ticks and fleas, that are located on the skin and/or in the fur of the animal 11. If a parasite is found 12, the individual removes the parasite from the animal 13. Next, the individual places the parasite into the alcohol based solution located in the bowl-shaped reservoir 14. When the individual is finished removing parasites from the animal 15, the individual cleans the dispensing cap 16 by rinsing the bowl-shaped reservoir out in a sink or by wiping the alcohol based solution and any dead parasites out of the bowl-shaped reservoir. The dispenser may then be used again by refilling the bowl-shaped reservoir with alcohol based solution from the bottle 17. Alternatively, the individual may store the dispenser by closing a lid over the bowl-shaped reservoir to prevent the alcohol based solution within the bottle from evaporating 18.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A method for killing and disposing of parasites comprising the steps of:
   a. providing a dispenser having a bottle containing an alcohol based solution, a dispensing cap having a bowl-shaped reservoir located on the bottle, and a supply tube extending from an aperture in the dispensing cap into the bottle;
   b. pushing downward on the dispensing cap to force a predetermined amount of the alcohol based solution through the supply tube and the aperture into the bowl-shaped reservoir;
   c. examining an animal for one or more parasites;
   d. finding a parasite;
   e. removing the parasite from the animal;
   f. placing the parasite into the alcohol based solution located in the bowl-shaped reservoir;
   g. finishing examining the animal for parasites; and
   h. cleaning the dispensing cap.

2. The method of claim 1 wherein:
the dispensing cap is cleaned by rinsing the bowl-shaped reservoir out.

3. The method of claim 1 wherein:
the dispensing cap is cleaned by wiping the bowl-shaped reservoir out.

4. The method of claim 1 further comprising the step of:
refilling the bowl-shaped reservoir with a predetermined amount of the alcohol based solution from the bottle.

5. The method of claim 1 further comprising the step of:
storing the dispenser by closing a lid over the bowl-shaped reservoir to prevent the alcohol based solution within the bottle from evaporating.

\* \* \* \* \*